US008132410B2

(12) United States Patent
Oh et al.

(10) Patent No.: US 8,132,410 B2
(45) Date of Patent: Mar. 13, 2012

(54) METHODS AND SYSTEMS FOR THE PRODUCTION OF HYDROGEN

(75) Inventors: Chang H. Oh, Idaho Falls, ID (US);
Eung S. Kim, Ammon, ID (US); Steven R. Sherman, Augusta, GA (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1112 days.

(21) Appl. No.: 11/958,142

(22) Filed: Dec. 17, 2007

(65) Prior Publication Data
US 2011/0131991 A1 Jun. 9, 2011

(51) Int. Cl.
*G21D 5/00* (2006.01)
(52) U.S. Cl. ............. 60/644.1; 60/649; 60/651; 60/671
(58) Field of Classification Search ............... 60/644.1, 60/649, 651, 671, 670
See application file for complete search history.

(56) References Cited

U.S. PATENT DOCUMENTS

| | | | |
|---|---|---|---|
| 3,490,871 A | 1/1970 | Miller et al. | |
| 3,917,211 A | 11/1975 | Daunderer et al. | |
| 3,971,211 A | 7/1976 | Wethe et al. | |
| 4,156,659 A * | 5/1979 | Barnhart | 376/323 |
| 4,293,385 A * | 10/1981 | Brachet | 376/283 |
| 4,312,184 A * | 1/1982 | Mangus | 60/644.1 |
| 4,896,507 A * | 1/1990 | Hosford | 60/641.8 |
| 6,674,830 B2 | 1/2004 | Kato et al. | |
| 2005/0044853 A1* | 3/2005 | Yoshino | 60/641.8 |
| 2006/0065302 A1 | 3/2006 | Gibson et al. | |
| 2006/0277917 A1 | 12/2006 | Hsu | |
| 2007/0138022 A1* | 6/2007 | Peter et al. | 205/628 |
| 2009/0323886 A1* | 12/2009 | El-Genk et al. | 376/402 |

OTHER PUBLICATIONS

McKellar et al., "A Process Model for the Production of Hydrogen Using High Temperature Electrolysis," International Conference on Nuclear Engineering (ICONE-14); Idaho National Laboratory, Jul. 2006, pp. 1-7.
Oh et al., "Development of a Supercritical Carbon Dioxide Brayton Cycle: Improving VHTR Efficiency and Testing Material Compatibility," Nuclear Energy Research Initiative, Dec. 2005, pp. 1-98.
Oh et al., "Thermal Hydraulic Analyses for Coupling High Temperature Gas-Cooled Reactor to Hydrogen Plant," Idaho National Laboratory, Aug. 2006, 11 pages.
PCT International Search Report and Written Opinion of the International Searching Authority for PCT/US08/86847, mailed Aug. 27, 2009, 10 pages.

\* cited by examiner

*Primary Examiner* — Hoang Nguyen
(74) *Attorney, Agent, or Firm* — TraskBritt

(57) ABSTRACT

Methods and systems are disclosed for the production of hydrogen and the use of high-temperature heat sources in energy conversion. In one embodiment, a primary loop may include a nuclear reactor utilizing a molten salt or helium as a coolant. The nuclear reactor may provide heat energy to a power generation loop for production of electrical energy. For example, a supercritical carbon dioxide fluid may be heated by the nuclear reactor via the molten salt and then expanded in a turbine to drive a generator. An intermediate heat exchange loop may also be thermally coupled with the primary loop and provide heat energy to one or more hydrogen production facilities. A portion of the hydrogen produced by the hydrogen production facility may be diverted to a combustor to elevate the temperature of water being split into hydrogen and oxygen by the hydrogen production facility.

24 Claims, 3 Drawing Sheets

METHODS AND SYSTEMS FOR THE PRODUCTION OF HYDROGEN

GOVERNMENT RIGHTS

This invention was made with government support under Contract No. DE-AC07-05-ID14517 awarded by the United States Department of Energy. The government has certain rights in the invention.

TECHNICAL FIELD

The present invention, in various embodiments, relates generally to the production of hydrogen and, more particularly, to the thermal coupling of a hydrogen production process with a high-temperature source.

BACKGROUND

Hydrogen is considered by many to be a promising energy alternative to carbon based fuels. Various technologies have been developed, and others are still being developed, regarding the production and use of hydrogen as a fuel or energy source. While many people consider hydrogen to be a desirable energy alternative to carbon based fuels, often based on the view of hydrogen being a clean energy source, various obstacles exist in creating a society that relies in substantial part on hydrogen as opposed to other forms of energy. Such obstacles generally include the ability to efficiently, safely and economically produce, transport and store hydrogen. In other words, it is desirable to make hydrogen, or other alternative energy sources, as readily available as current energy sources (such as gasoline) are in today's market.

One conventional approach to producing hydrogen includes thermochemical processes. One such process includes carrying out chemical reactions between a sulfur-iodine compound and water at high temperatures (e.g., above approximately 800° C.). Generally, the process results in the splitting of the water molecules ($H_2O$) into hydrogen ($H_2$) and oxygen ($O_2$). The sulfur-iodine solution is recycled in the process and, therefore, other than hydrogen and oxygen, there are no byproducts of concern.

Another conventional approach to producing hydrogen includes the electrolysis of water. Often, without the aid of another energy source (beyond the supply of electricity), electrolysis is considered a relatively inefficient process for producing hydrogen. Indeed, the energy consumed may be more valuable than the hydrogen produced. In order to make electrolysis an economically viable process, another energy source may be incorporated into the process. For example, high-temperature electrolysis utilizes a high-temperature heat source to heat the water and effectively reduce the amount of electrical energy required to split the water molecules into hydrogen and oxygen with higher efficiencies.

In various processes where a high-temperature heat source is desired to assist with hydrogen production (in both electrolysis processes and thermochemical processes), a nuclear reactor is believed to be one appropriate source of heat. Next generation nuclear plants (NGNPs) are believed to be suitable heat sources for a variety of applications based on their capability of reaching outlet temperatures (the temperature of fluid(s) flowing out of the reactor) of approximately 900° C. to 1000° C. While such temperatures may seem particularly suitable for use in a large number of process heat applications, including the production of hydrogen, various obstacles still remain. For example, currently known materials may be limited in their ability to perform at the very high temperatures at which NGNPs may operate.

More specifically, the class of high-temperature metallic alloys contemplated for use in NGNPs (including their use in reactors, outlet piping, heat exchangers and other related components) appear to maintain their tensile strength up to about 600° C. and then begin to drop at increasing temperatures. At approximately 700° C., their drop in strength is rather noticeable and the drop in strength is rather dramatic at 800° C. (i.e., over 50% reduction as compared to that at 600° C.). Currently, no commercially available alloy is known to the inventors that may be used at temperatures above 900° C. for heat exchange applications involving anything but a negligible pressure drop across heat exchange surfaces.

Additionally, the creep rupture strength of such materials depends on the operating time at a given temperature. For example, in one high-temperature metallic alloy, at an operating time of approximately 100,000 hours (about 11 years), the rupture strength is about 240 Megapascals (MPa) at a temperature of approximately 500° C. However, the rupture strength will decrease to about 8 MPa at a temperature of about 900° C. The rupture strength also depends on the amount of time exposed to the particular temperature. Thus, at 900° C., the rupture strength of one particular high-temperature metallic alloy will increase from approximately 8 MPa to approximately 16 MPa when the operating time decreases from 100,000 hours to 10,000 hours.

Moreover, corrosion of high-temperature alloys will typically be accelerated at increased temperatures. In one example, corrosion of reactor components, including heat transfer loops and heat exchangers, may occur from impurities in the helium coolant used, for example, to cool the reactor core. Such corrosion has been shown to accelerate at temperatures in excess of approximately 800° C. unless the chemistry of the helium impurities is carefully controlled.

To underscore the issue of materials being limited in their use in high-temperature environments, it is noted that the American Society of Mechanical Engineers (ASME) codification of metallic alloys for nuclear use at 900° C. is incomplete. While a draft code was prepared for a particular alloy in 1989 that would allow for its use in specified applications at temperatures up to 982° C., the draft was not pursued to completion.

Additionally, while some ceramic materials have been proposed as substitutes for metallic alloys in high-temperature applications (based in part on their high-temperature strength remaining substantially constant from room temperature to approximately 1,000° C.), there are no ceramics that are ASME code certified for use in nuclear systems and a code case would have to be created for any specific ceramics of interest.

In light of the above issues, other approaches are needed to address the use of high-temperature heat sources in applications such as hydrogen production, such that the hydrogen production as well as other processes (i.e., those associated with the high-temperature heat source) may be carried out in an effective, efficient and safe manner.

BRIEF SUMMARY OF THE INVENTION

Methods and systems are provided in accordance with various embodiments of the invention for producing hydrogen and for utilizing and converting heat energy. In accordance with one embodiment of the present invention, a method of producing hydrogen is provided. The method includes thermally coupling a high-temperature heat source with a hydrogen production facility. A feed stream of water is heated with the high-temperature heat source and the heated water is split into a first stream comprising primarily hydrogen and a second stream comprising primarily oxygen. A portion of the first stream is combusted to heat the feed stream of water.

In accordance with another embodiment of the present invention, a system is provided for producing hydrogen. The system includes a high-temperature heat source and a hydrogen production facility configured to split water molecules of a mass of water into a first stream comprising primarily hydrogen and a second stream comprising primarily oxygen. A water flow path is configured to convey water from a water source to the hydrogen production facility. A hydrogen flow path is configured to flow any produced hydrogen from the hydrogen production facility. An oxygen flow path is configured to flow any produced oxygen from the hydrogen production facility. At least one heat exchanger is configured to thermally couple the high-temperature heat source and the water flow path. A combustor is thermally coupled with the water flow path, and a diversion flow path is configured to divert a portion of any produced hydrogen from the hydrogen flow path to the combustor.

In accordance with yet another embodiment of the present invention, a plant is provided that includes a primary heat loop, an intermediate heat exchange loop thermally coupled with the primary heat loop, a power generation loop thermally coupled to the primary heat loop, and a hydrogen production facility thermally coupled to the intermediate heat exchanger loop.

The primary heat loop includes a nuclear reactor, a first heat exchanger, a second heat exchanger, a pump, piping defining, in part, a first flow path from the pump through the nuclear reactor, through the first heat exchanger, through the second heat exchanger and back to the pump, and a mass of a molten salt or helium disposed within the first flow path.

The intermediate heat exchange loop includes a third heat exchanger, a pump or compressor, piping defining, in part, a second flow path from the first heat exchanger, through the third heat exchanger, through the compressor and back to the first heat exchanger, and another mass of a molten salt or helium disposed in the second flow path.

The power generation loop includes an expansion turbine, at least one recuperator, at least one compressor, piping defining, in part, a third flow path from the second heat exchanger, through the turbine, through the at least one recuperator, through the at least one compressor and back to the second heat exchanger, and a mass of supercritical carbon dioxide disposed within the third flow path.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
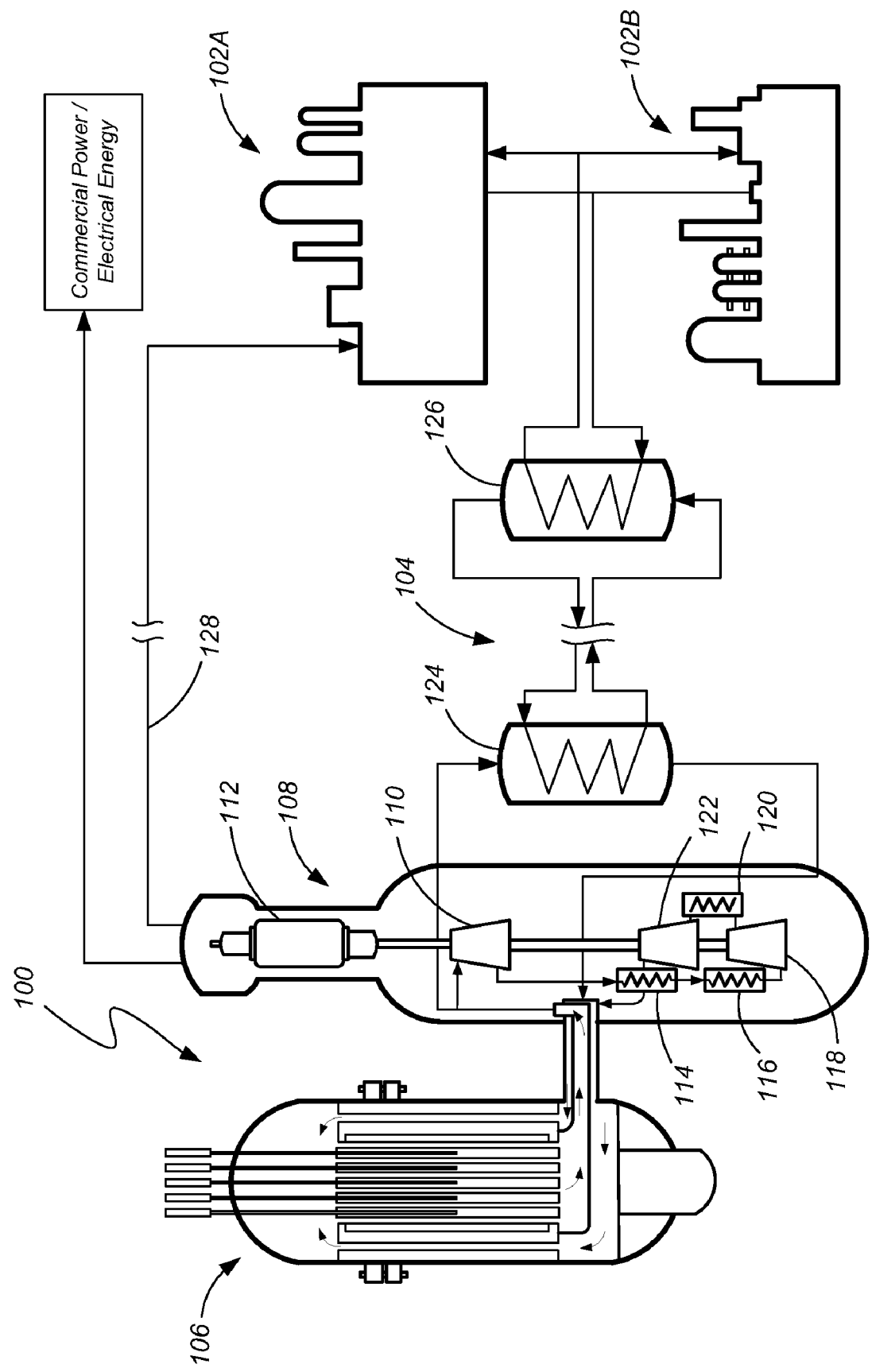
FIG. 1 is a schematic view of a nuclear plant and hydrogen production facilities in accordance with an embodiment of the present invention.

Referring to FIG. 1, a schematic is shown of a system employing a high-temperature heat source 100 thermally coupled with hydrogen production facilities 102A and 102B by way of a thermal loop 104 (also referred to herein as an intermediate heat exchange loop). The heat source 100 may include, for example, a nuclear reactor 106 having a fluid coolant that also acts as a transfer medium or a thermal energy source for a power conversion unit (PCU) 108 as well as a thermal energy source for other processes, such as those associated with the hydrogen production facilities 102A and 102B.

In one embodiment, the reactor 106 may include a very high-temperature reactor (VHTR) having a reactor core including either a prismatic graphite block type core or a pebble bed core. In one example, such a reactor 106 may be configured to produce approximately 600 thermal megawatts ($MW_t$).

A variety of fluids may be used to transfer heat away from the reactor and for use in other processes. For example, in one embodiment the fluid may include helium. In another embodiment, a molten salt may be used. Those of ordinary skill in the art will recognize that other fluids may be suitable for use as a coolant and heat transfer medium depending, for example, on the temperatures to which the fluid will be subjected, the types of materials being used to construct different components of the plant, and other material and process parameters. In one embodiment according to the present invention, the reactor may be configured to generate outlet temperatures (the temperature of the coolant provided to one of the other processes such as the PCU 108 or to the hydrogen facilities 102A and 102B) of up to approximately 900° C.

The reactor 106 may be thermally coupled with the power conversion unit 108 to produce electricity. For example, the heat from the reactor 106 may be transferred to the coolant fluid that is expanded by a turbine 110 associated with the PCU 108. The turbine 110 may be mechanically coupled with a generator 112 such that expansion of the heated fluid results in rotation of a shaft in the generator to produce electrical energy.

After being expanded, the fluid may be processed to place it in a desired state (e.g., temperature and pressure) prior to returning to the reactor 106 and absorbing additional heat therefrom. For example, as seen in FIG. 1, in one embodiment, the expanded fluid may flow from the turbine 110 through one or more recuperators 114 to transfer heat to other fluid (e.g., helium or a molten salt) that is about to reenter the reactor 106. The fluid may then pass from the recuperator 114 through a primary heat rejection apparatus or system 116 (e.g., a cooling tower) and then enter a low pressure compressor 118. The compressed fluid stream may then pass through an intercooler 120 to reduce the temperature of the compressed stream. The cooled, compressed stream may then pass through a high pressure compressor 122, through the recuperator 114 and back to the reactor 106. The turbine 110 may be mechanically coupled to the compressors 118 and 122 to provide necessary power thereto as will be appreciated by those of ordinary skill in the art.

In addition to providing heat energy to the PCU 108, the fluid used to cool the core of the reactor 106 may also be used as a heat source for other processes. For example, fluid may flow from the reactor 106 to a heat exchanger 124 of the thermal loop 104. The thermal loop 104 may be used to transfer heat from the reactor 106 to other processes without the need to flow the coolant fluid of the reactor 106 directly through components of other facilities of processes. In other words, heat is transferred from the coolant fluid of the reactor 106, via the heat exchanger 124, to another fluid within the thermal loop 104. The fluid in the thermal loop 104 may include, for example, a molten salt or helium.

The fluid in the thermal loop 104 may pass through another heat exchanger 126, which is thermally coupled to, for example, one or more facilities 102A and 102B for producing hydrogen. In one embodiment, one facility 102A may be configured to produce hydrogen using a high-temperature steam electrolysis (HSTE) process. The facility 102A may be thermally coupled with the thermal loop 104, such as by way of the heat exchanger 126, to help produce the steam in the HTSE process and to provide energy for other process acts. It is noted that electrical energy may also be provided by the PCU 108 (as indicated by transmission line 128) for an HTSE process.

Additionally, or in another embodiment, another facility 102B configured to produce hydrogen using a thermochemical process (e.g., a sulfur-iodine process) may be thermally coupled with the thermal loop 104, such as by way of the heat exchanger 126, to provide heat energy for use during the chemical process to help enable the process splitting of water into hydrogen and oxygen.

It is noted that in the embodiment described with respect to FIG. 1, the fluid coolant of the reactor 106 may act as a direct thermal energy source (such as by flowing directly through expansion turbine 110 to power the generator 112 and compressors 118 and 122) or it may act as an indirect thermal energy source (such as by transferring heat to another fluid medium that may be used as a thermal energy source as with the thermal loop 104 and the hydrogen production facilities 102A and 102B).

Figure 2:
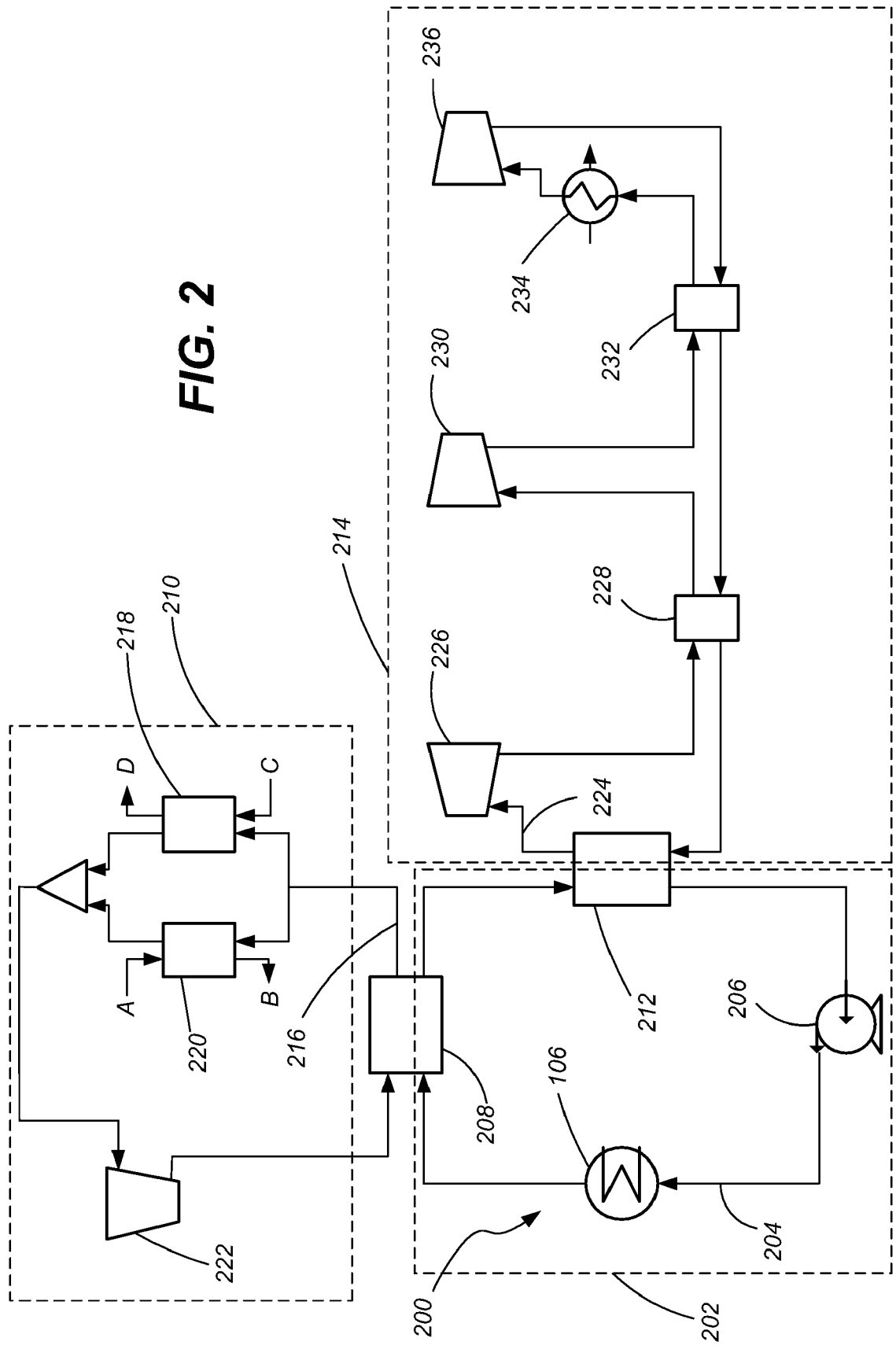
FIG. 2 is a process schematic of a nuclear reactor thermally coupled with a hydrogen production facility in accordance with an embodiment of the present invention.

Referring now to FIG. 2, a process flow schematic of a system employing a high-temperature heat source 200 is shown in further detail in accordance with another embodiment of the present invention. A primary loop 202 of the system may include a flow path 204 for coolant fluid to flow through a pump 206, through a heat producing system or apparatus such as a reactor 106 and then through a heat exchanger 208, which is also thermally coupled with an intermediate heat exchange loop 210. The flow path 204 continues through another heat exchanger 212 that is thermally coupled with a power generation loop 214 and continues back to the pump 206. While a variety of materials may be used for the fluid passing through the flow path 204 of the primary loop 202, one embodiment may include using a molten salt as the fluid. For example, FLiNaK (LiF—NaF—KF, 46.5%, a molar mixture with 11.5% NaF, and 42% KF), or $NaBF_4$-NaF (92% and 8%, respectively) may be used. While other fluids may be used, including, for example, helium, the use of a molten salt is believed to provide a measurable increase in the efficiency of the primary loop 202 due to the reduced power required to pump a liquid as compared to pumping a gas such as helium. Additionally, the diameter of piping used to form the flow path 204 may be reduced when using a molten salt as a coolant instead of a gas.

The intermediate heat exchange loop 210 includes a flow path 216 that flows through the heat exchanger 208, is split so as to flow in parallel through additional heat exchangers 218 and 220 (which may be associated with a hydrogen production process as will be described in further detail herein), and is then combined again to flow through a compressor 222 where the pressure of any fluid flowing through the path is raised to a desired level. The fluid then flows back to the heat exchanger 208 to be heated again. As will be discussed in further detail herein below, the heat exchangers 218 and 220 of the intermediate heat exchange loop 210 may be thermally coupled with one or more processes such as, for example, hydrogen production processes. While a variety of fluids may be utilized, in one embodiment the fluid used in the intermediate heat exchange loop 210 may include, for example, a molten salt. In another embodiment, the fluid may include a gas such as helium.

The power generation loop 214 may include a flow path 224 that passes through the heat exchanger 212 and to a turbine 226, which expands the fluid as it passes therethrough. As with the embodiment described with respect to FIG. 1, the turbine 226 may be coupled to one or more devices, such as a generator (not shown in FIG. 2) for generating electrical power. The expanded fluid stream may then flow through a recuperator 228 or other heat exchange device and to compressor 230 to raise the pressure of the fluid. The compressed fluid may flow through another recuperator 232 (or other heat exchanger device), through a further heat exchange device such as a precooler 234, and then through another compressor 236 to further raise the pressure of the fluid. The fluid may flow from the compressor 236 back through the recuperators 232 and 228 and through the heat exchanger 212 again. It is noted that the compressors 230 and 236 may be mechanically coupled and driven by the turbine 226 such as has been described previously with respect to other embodiments.

In one embodiment, the fluid used in the power generation loop 214 may include supercritical carbon dioxide (S—$CO_2$). The use of S—$CO_2$ is believed to provide additional efficiency to the process by reducing the amount of compression work required based on the high density of S—$CO_2$. Compressing the S—$CO_2$ to high pressures in the power generation loop 214 may help achieve a higher polytropic expansion temperature as the fluid exits the turbine 226. It is noted that, in other embodiments, other fluids may be utilized, including, for example, molten salts, helium or other appropriate fluids.

Figure 3:
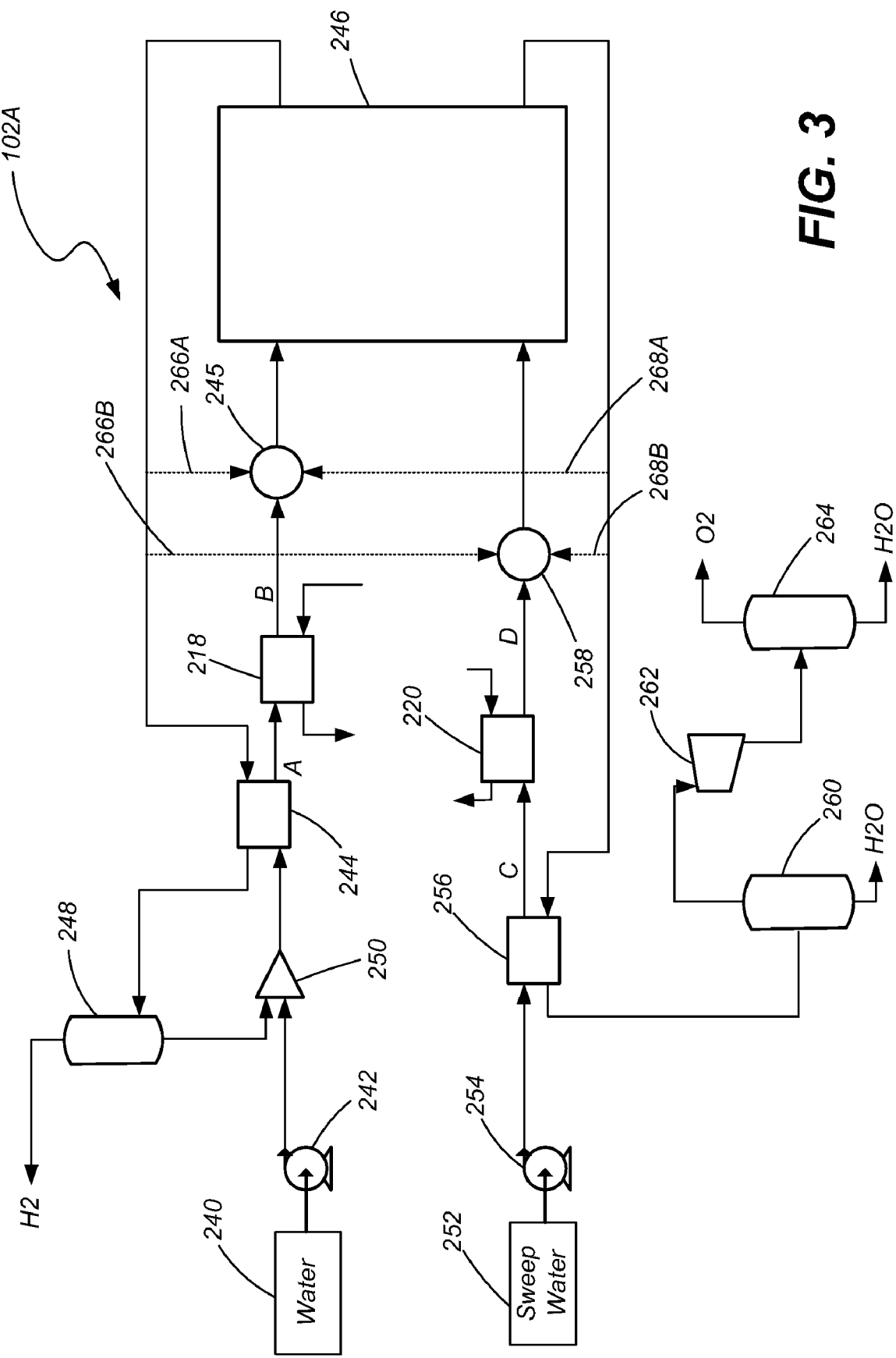
FIG. 3 is a process schematic, in further detail, of a hydrogen production facility thermally coupled with a high-temperature source.

Referring now to FIG. 3, a process schematic is shown of portions of a hydrogen production facility 102A in accordance with an embodiment of the present invention. The facility 102A may include a water supply 240 that is fed into the system by way of a pump 242. The water may flow through a first heat exchanger 244 to increase the temperature of the water, and then through a heat exchanger 218 associated with the intermediate heat exchange loop 210 (FIG. 2). After passing through the heat exchangers 244 and 218, the water may then flow through a combustor 245, which further heats the water in preparation for the water to pass through an electrolyzer 246. As mentioned previously, the electrolyzer 246 uses heat and electricity to split the water molecules into hydrogen and oxygen.

A hydrogen stream exits the electrolyzer 246, passes through the heat exchanger 244, and enters into a gas-liquid separator 248. The hydrogen stream may still include a portion of water that is separated out in the separator 248. The water leaves the separator 248 and is combined with water from the water supply 240 by way of a mixing valve 250 or other appropriate piping. Hydrogen exits the separator and may be stored, transported or processed further depending on its intended use.

The facility 102A may also include a source of sweep water 252 that is fed to the electrolyzer 246 by a pump 254. The sweep water 252 passes through a first heat exchanger 256 and then through a heat exchanger 220 associated with the intermediate heat exchange loop 210 (FIG. 2) to increase its temperature. The sweep water 252 passes through a combustor 258 to further increase its temperature, and then enters the electrolyzer 246. The sweep water 252 assists with the hydrogen production process by helping to capture and remove oxygen that has been split from hydrogen.

An oxygen stream leaves the electrolyzer 246 and passes through one of the heat exchangers 256 and to a gas-liquid separator 260. Water and oxygen are separated, with a water stream exiting the separator 260 for collection, storage, recycling or further processing. Another stream containing both water and oxygen is passed through an expansion turbine 262 and into another gas-liquid separator 264. Oxygen and water streams each exit the separator 264 for collection, storage, recycling or further processing as may be desired.

Diversion streams 266A and 266B may be used to divert a small portion of the hydrogen stream to either or to both of the combustors 245 and 258. Likewise, diversion streams 268A and 268B may be used to divert a small portion of the oxygen stream to either or to both of the combustors 245 and 258. The diversion of a small portion of the hydrogen and oxygen produced by the electrolyzer 246 enables the combustors 245 and 258 to efficiently heat the water and sweep water streams to a desired temperature. The use of the combustors, and the diverted hydrogen, oxygen or both, enables the heat exchangers 218 and 220 to operate at a relatively lower temperature than would be required otherwise, while maintaining high process temperatures desired for operation of the electrolyzer 246. Additionally, use of the combustors 245 and 258 enables the high-temperature heat source 200 to operate at a relatively lower temperature.

For example, the electrolyzer may utilize a solid oxide fuel cell (SOFC), which must be maintained at a relatively high temperature (e.g., above approximately 850° C.). However, because of material limitations as previously discussed, it may not be desirable to operate the reactor 106 or the intermediate heat exchange loop 210 at the high temperatures associated with the operation of the SOFC.

Only a small amount of hydrogen and oxygen produced by the electrolyzer 246 may need to be utilized to provide the desired temperature increase. For example, in one embodiment, only approximately 0.014 mole fraction of the hydrogen produced need be utilized in the combustors 245 and 258. The reaction of the hydrogen and the oxygen in the combustor is highly exothermic and, thus, provides substantial heat to the water and sweep water streams. The product of the reaction in the combustor is water that may be recycled into the system without the need for an additional heat exchanger.

It is noted that other sources of hydrogen, oxygen or both may be used, for example, during start-up of the hydrogen production facility 102A when hydrogen and oxygen have not yet been produced thereby. In another embodiment, another supplement heat source may be used to further heat the water and sweep water during start-up of the hydrogen production facility 102A. Additionally, in another embodiment, a small amount of hydrogen may be diverted for use in the combustor with air (rather than diverted oxygen) to produce the additional heat for the water, sweep water, or both.

EXAMPLE

The following is an example based on modeling of the embodiments described with respect to FIGS. 2 and 3. Reference is made to FIGS. 2 and 3 to indicated state points (e.g., temperature, pressure, flow rates and composition) of various loops and streams within the process.

Referring first to FIG. 2, in the primary loop 202, a molten salt fluid will enter the reactor 106 at a temperature of approximately 550° C. at a pressure of approximately 1.05 MPa and with a mass flow rate of approximately 2,125 kilograms per second (kg/s). The fluid will exit the reactor 106 at a temperature of approximately 700° C. and at a pressure of approximately 1 MPa. After passing through the heat exchanger 208 coupled with the intermediate heat exchange loop 210, the fluid will exhibit a temperature of approximately 689° C. and a pressure of 0.95 MPa. After passing through the heat exchanger 212 coupled with the power generation loop 214, the fluid will exhibit a temperature of approximately 550° C. and a pressure of approximately 0.81 MPa.

Turning to the power generation loop 214, the S—$CO_2$ fluid will leave the heat exchanger 212 at a temperature of approximately 680° C. at a pressure of approximately 19.9 MPa and at a mass flow rate of approximately 2,325 kg/s. After passing through the turbine 226, the fluid will exhibit a temperature of approximately 520° C. and a pressure of approximately 6 MPa. The fluid will pass through the first recuperator 228 and will exhibit a temperature of approximately 220° C. and a pressure of approximately 5.95 MPa. After passing through the compressor 230, the fluid will exhibit a temperature of approximately 276° C. and a pressure of approximately 9.7 MPa. After passing through the second recuperator 232 and the precooler 234, the fluid will exhibit a temperature of approximately 33° C. and a pressure of approximately 9.6 MPa. After passing through the second compressor 236, the fluid will exhibit a temperature of approximately 49.5° C. and a pressure of approximately 20 MPa. After passing back through the second recuperator 232, the fluid will exhibit a temperature of approximately 214° C. and a pressure of approximately 20 MPa. After passing back through the first recuperator 228, the temperature of the fluid will be increased to approximately 485° C. and the pressure will be approximately 19.9 MPa. The fluid will then pass through the heat exchanger 212 to increase its temperature and continue the cycle.

Turning to the intermediate heat exchange loop 210, a flow of helium will leave the heat exchanger coupled with the primary loop 202 at a temperature of approximately 690° C., at a pressure of 5 MPa and at a mass flow rate of approximately 23.8 kg/s, which will be split into the hot side of the heat exchangers 220 and 218. Helium will leave the heat exchanger 218 coupled with streams A and B at a temperature of approximately 500° C., at a pressure of 5 MPa and a mass flow rate of approximately 5.3 kg/s. Helium will leave the heat exchanger 220 coupled with streams C and D at a temperature of approximately 300° C., at a pressure of 5 MPa and a mass flow rate of approximately 18.5 kg/s. The inlet conditions to the compressor 222 will be at an approximate temperature of 344.8° C., a pressure of 4.98 MPa, and a mass flow rate of 23.8 kg/s. Exiting the compressor 222, the fluid will exhibit a temperature of approximately 349° C. and a pressure of approximately 5.05 MPa.

Turning now to FIG. 3, water will enter the pump 242 at a temperature of approximately 21.1° C., at a pressure of approximately 0.1 MPa, at a flow rate of approximately 16 kg/s and having a mole fraction of $H_2O$ of 1.0. Water will exit the pump 242 and, prior to entering the mixing valve 250, will exhibit a temperature of approximately 21.5° C. at a pressure of approximately 5 MPa. Water will leave the mixing valve 250 at a temperature of approximately 22.1° C., at a pressure of approximately 5 MPa and at a mass flow rate of approximately 17.8 kg/s.

At a location between the two heat exchangers 244 and 218, the water will exhibit a temperature of approximately 265.4° C. at a pressure of approximately 5 MPa. After passing through the heat exchanger 218 associated with the intermediate heat exchange loop 210 (FIG. 2), the water will exhibit a temperature of approximately 670° C. at a pressure of approximately 5 MPa. The water will then flow through the combustor 245, where a reaction occurs based on the diverted hydrogen and oxygen, and the resulting stream will exhibit a temperature of approximately 826.9° C., a pressure of approximately 5 MPa, a flow rate of approximately 19.14 kg/s and have a composition of approximately 0.9 mole fraction $H_2O$ and approximately 0.1 mole fraction $H_2$.

A hydrogen stream (although not pure hydrogen) will exit the electrolyzer 246 and, prior to having any of the stream diverted to the combustor 245, will exhibit a temperature of approximately 858° C., a pressure of approximately 5 MPa, a flow rate of approximately 4.22 kg/s and a mole fraction of approximately 0.1 $H_2O$ and approximately 0.9 $H_2$. At a location between the heat exchanger 244 and the separator 248, the hydrogen stream will exhibit a temperature of approximately 27.1° C., a pressure of approximately 5 MPa and a mass flow rate of approximately 3.6 kg/s. Hydrogen will exit the separator 248 at a temperature of approximately 27.1° C., a pressure of approximately 5 MPa and a mass flow rate of approximately 1.82 kg/s. Water will exit the separator 248 and enter the mixing valve 250 at 27.1° C., a pressure of approximately 5 MPa and a mass flow rate of approximately 1.77 kg/s.

Sweep water 252 will enter the pump 254 at a temperature of approximately 21.1° C., a pressure of approximately 0.1 MPa, at a flow rate of approximately 10 kg/s, and have a mole fraction of $H_2O$ of 1.0. After passing through the pump 254, the sweep water 252 will exhibit a temperature of approximately 27.1° C. and a pressure of approximately 5 MPa. At a location between the two heat exchangers 256 and 220, the sweep water 252 will exhibit a temperature of a approximately 444° C. at a pressure of approximately 5 MPa. After passing through the heat exchanger 220 associated with the intermediate heat exchange loop 210 (FIG. 2), the sweep water 252 will exhibit a temperature of approximately 670° C. and a pressure of approximately 5 MPa. After the combustor 258, where a reaction occurs due to the diversion of a small amount of hydrogen and oxygen, resulting stream will exhibit a temperature of approximately 826.9° C., a pressure of approximately 5 MPa, at a flow rate of approximately 10.96 kg/s, and have a composition of approximately 0.9843 mole fraction $H_2O$ and approximately 0.0157 mole fraction $O_2$.

The oxygen stream exiting the electrolyzer 246 (although not pure oxygen) will exhibit a temperature of approximately 858° C., a pressure of approximately 5 MPa, a mass flow rate of approximately 25.9 kg/s and will have a composition of approximately 0.5542 mole fraction $H_2O$ and approximately 0.4458 mole fraction $O_2$. The oxygen stream exiting the heat exchanger 256 will exhibit a temperature of approximately 210° C., a pressure of approximately 5 MPa and a mass flow rate of approximately 24.3 kg/s. The water stream exiting the separator 260 will exhibit a temperature of approximately 210° C., a pressure of approximately 5 MPa, a mass flow rate of approximately 4.1 kg/s and a composition of approximately 0.9983 mole fraction $H_2O$ and approximately 0.0017 mole fraction $O_2$. The stream between the separator 260 and the turbine 262 will exhibit a temperature of approximately 210° C., a pressure of approximately 5 MPa, a mass flow rate of approximately 20.2 kg/s and a composition of approximately 0.4239 mole fraction $H_2O$ and approximately 0.5761 mole fraction $O_2$. Between the turbine 262 and the second separator 264, the stream will exhibit a temperature of approximately 72° C., and a pressure of approximately 0.1 MPa. The water stream exiting the separator 264 will exhibit a temperature of approximately 21° C., a pressure of approximately 0.1 MPa, a mass flow rate of approximately 5.7 kg/s and have a composition of 1.0 mole fraction $H_2O$. The oxygen stream will exit the separator 264 at a temperature of approximately 21° C., a pressure of approximately 0.1 MPa, a mass flow rate of approximately 14.5 kg/s and exhibit a composition of approximately 0.0244 mole fraction $H_2O$ and approximately 0.9756 mole fraction $O_2$.

Based on analysis including the above example, embodiments of the present invention such as described with respect to FIG. 2 will result in 45.1% overall thermodynamic efficiency with the reactor 106 operating to produce an outlet temperature of approximately 700° C. as compared to a baseline system, configured generally similar to that which is described with respect to FIGS. 2 and 3, except that helium is used as a working fluid in all the loops and the outlet temperature of the reactor is 900° C., wherein the system will operate at an overall thermodynamic efficiency of approximately 46.2%. To compensate for the lower temperature (e.g., 700° C. outlet vs. 900° C. outlet) in providing heat to the hydrogen production processes, the combustors 245 and 258 are implemented, driving the temperature of the water and sweep water to desired levels and maintaining a desired level of efficiency in the hydrogen production facility 102A.

It is noted that, while certain embodiments of the invention have been described generally in terms of utilizing a nuclear reactor as a high-temperature heat source, other heat sources may be utilized. For example, implementations utilizing a solar tower or a coal burning plant are contemplated. Depending on the amount of heat provided by such heat sources, additional amounts of hydrogen and oxygen may be diverted to combustors to compensate for lower temperatures if desired.

It is also noted that, while embodiments of the invention have been described in terms more particularly relating to HTSE processes of producing hydrogen, the use of produced hydrogen, oxygen or both to feed combustors and raise the temperature of the feed streams may be incorporated into other processes including, for example, thermochemical processes for producing hydrogen.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. A method of producing hydrogen, the method comprising:
  heating a feed stream comprising water with a high-temperature heat source to form a heated feed stream;
  directing the heated feed stream into a splitting device to convert the heated feed stream into a first stream comprising hydrogen and a second stream comprising oxygen; and
  combusting a portion of the first stream to further heat the heated feed stream before directing the heated feed stream into the splitting device.

2. The method according to claim 1, further comprising:
  cooling a remaining portion of the first stream; and
  removing water from the remaining portion of the first stream.

3. The method according to claim 2, further comprising combining the water with the feed stream.

4. The method according to claim 3, further comprising:
  cooling at least a portion of the second stream;
  removing water from the at least a portion of the second stream to form a third stream comprising a relatively increased fraction of oxygen; and
  expanding the third stream.

5. The method according to claim 4, further comprising removing water from the expanded third stream.

6. The method according to claim 1, wherein heating the feed stream with the high-temperature heat source comprises indirectly thermally coupling a nuclear reactor with a hydrogen production facility receiving the feed stream.

7. The method according to claim 6, wherein indirectly thermally coupling the nuclear reactor with the hydrogen production facility comprises:
heating a first fluid comprising a molten salt or helium with the nuclear reactor and passing the first fluid through a first heat exchanger;
directly thermally coupling an intermediate heat exchange loop with the first heat exchanger; and
directly thermally coupling the intermediate heat exchange loop with the feed stream.

8. The method according to claim 7, wherein directly thermally coupling the intermediate heat exchange loop with the first heat exchanger comprises heating a second fluid comprising a molten salt with the first heat exchanger, and wherein directly thermally coupling the intermediate heat exchange loop with the feed stream comprises passing the second fluid through a second heat exchanger and heating the feed stream with the second heat exchanger.

9. The method according to claim 7, further comprising:
passing the first fluid through a second heat exchanger;
heating supercritical carbon dioxide with the second heat exchanger;
directing the supercritical carbon dioxide through an expansion turbine; and
driving a generator with the expansion turbine.

10. The method according to claim 1, further comprising combusting a portion of the second stream with the portion of the first stream.

11. A system for producing hydrogen comprising:
a high-temperature heat source configured to heat a first coolant fluid;
a hydrogen production facility configured to split molecules in a mass of water into a first stream comprising hydrogen and a second stream comprising oxygen;
a water flow path configured to deliver water from a water source to the hydrogen production facility;
a hydrogen flow path configured to direct produced hydrogen from the hydrogen production facility;
an oxygen flow path configured to direct produced oxygen from the hydrogen production facility;
at least two heat exchangers configured to thermally couple the high-temperature heat source and the water flow path;
a combustor thermally coupled with the water flow path and configured to heat the water of the water flow path before the hydrogen production facility receives the water; and
a diversion flow path configured to divert a portion of the produced hydrogen from the hydrogen flow path to the combustor.

12. The system of claim 11, wherein the high-temperature heat source includes a nuclear reactor.

13. The system of claim 12, wherein the at least two heat exchangers comprise:
a first heat exchanger configured to exchange heat between the first coolant fluid and a second coolant fluid; and
a second heat exchanger configured to exchange heat between the second coolant fluid and the water of the water flow path.

14. The system of claim 13, further comprising:
a third heat exchanger configured to exchange heat between the first coolant fluid and another fluid;
a expansion turbine configured to expand the another fluid; and
a generator operably coupled to the expansion turbine.

15. The system of claim 14, wherein the another fluid comprises supercritical carbon dioxide.

16. The system of claim 15, wherein the first coolant fluid comprises a molten salt or helium fluid.

17. The system of claim 16, wherein the second coolant fluid comprises a molten salt or helium fluid.

18. The system of claim 11, further comprising another diversion flow path configured to divert a portion of the produced oxygen from the oxygen flow path to the combustor.

19. A plant comprising:
a primary heat loop comprising:
a first coolant fluid;
a nuclear reactor configured to heat the first coolant fluid;
a first heat exchanger positioned downstream of the nuclear reactor and configured to transfer heat from the first coolant fluid to a second coolant fluid; and
a second heat exchanger positioned downstream of the first heat exchanger and configured to transfer heat from the first coolant fluid to a third coolant fluid comprising supercritical carbon dioxide;
an intermediate heat exchange loop comprising:
the second coolant fluid; and
a third heat exchanger positioned downstream of the first heat exchanger and configured to transfer heat from the second coolant fluid to a first fluid comprising water;
a power generation loop comprising:
the third coolant fluid; and
an expansion turbine positioned downstream of the second heat exchanger and configured to expand the third coolant fluid; and
at least one hydrogen production facility thermally coupled to the third heat exchanger and configured to produce hydrogen gas and oxygen gas from the first fluid.

20. The plant of claim 19, further comprising:
a fourth heat exchanger positioned upstream of the third heat exchanger and configured to heat the first fluid;
a combustor positioned downstream of the third heat exchanger and configured to heat the first fluid; and
an electrolyzer positioned downstream of the combustor and configured to split the first fluid into a third fluid comprising hydrogen and a fourth fluid comprising oxygen.

21. The plant of claim 20, further comprising a first gas-liquid separator positioned downstream of the electrolyzer and configured to remove a fifth fluid comprising water from the third fluid.

22. The plant of claim 21, further comprising a mixer positioned downstream of the gas-liquid separator and configured to combine the fifth fluid with the first fluid.

23. The plant of claim 21, further comprising a second gas-liquid separator positioned downstream of the electrolyzer, in parallel with the first gas-liquid separator, and configured to remove a sixth fluid comprising water from the fourth fluid.

24. The plant of claim 19, wherein the intermediate heat exchange loop further comprises a fourth heat exchanger positioned downstream of the first heat exchanger, in parallel with the third heat exchanger, and configured to transfer heat from the second coolant fluid to a third fluid comprising water.

* * * * *